United States Patent
Obukhov et al.

(10) Patent No.: US 9,665,501 B1
(45) Date of Patent: May 30, 2017

(54) SELF-ENCRYPTING DATA STORAGE DEVICE SUPPORTING OBJECT-LEVEL ENCRYPTION

(71) Applicant: Western Digital Technologies, Inc., Irvine, CA (US)

(72) Inventors: Dmitry S. Obukhov, San Jose, CA (US); Agnel Soundron, Erie, CO (US); Pravin Singh, Rancho Santa Margarita, CA (US); Justin Jones, Burlingame, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 158 days.

(21) Appl. No.: 14/090,202

(22) Filed: Nov. 26, 2013

Related U.S. Application Data (60) Provisional application No. 61/836,603, filed on Jun. 18, 2013.

(51) Int. Cl.
  *G06F 21/00* (2013.01)
  *G06F 12/14* (2006.01)
  *H04L 9/08* (2006.01)

(52) U.S. Cl.
  CPC ........ *G06F 12/1408* (2013.01); *H04L 9/0861* (2013.01)

(58) Field of Classification Search
  CPC .......................... G06F 12/1408; H04L 9/0861
  See application file for complete search history.

(56) References Cited

U.S. PATENT DOCUMENTS

| | | |
|---|---|---|
| 6,856,556 B1 | 2/2005 | Hajeck |
| 7,126,857 B2 | 10/2006 | Hajeck |
| 7,430,136 B2 | 9/2008 | Merry, Jr. et al. |
| 7,447,807 B1 | 11/2008 | Merry et al. |
| 7,502,256 B2 | 3/2009 | Merry, Jr. et al. |
| 7,509,441 B1 | 3/2009 | Merry et al. |
| 7,596,643 B2 | 9/2009 | Merry, Jr. et al. |
| 7,653,778 B2 | 1/2010 | Merry, Jr. et al. |
| 7,685,337 B2 | 3/2010 | Merry, Jr. et al. |
| 7,685,338 B2 | 3/2010 | Merry, Jr. et al. |
| 7,685,374 B2 | 3/2010 | Diggs et al. |
| 7,733,712 B1 | 6/2010 | Walston et al. |
| 7,765,373 B1 | 7/2010 | Merry et al. |
| 7,898,855 B2 | 3/2011 | Merry, Jr. et al. |
| 7,912,223 B2 * | 3/2011 | Osaki ...................... G06F 21/62 380/277 |
| 7,912,991 B1 | 3/2011 | Merry et al. |
| 7,936,603 B2 | 5/2011 | Merry, Jr. et al. |

(Continued)

*Primary Examiner* — Jeffrey Pwu
*Assistant Examiner* — William Corum, Jr.
(74) *Attorney, Agent, or Firm* — McDermott Will & Emery LLP (57) ABSTRACT

A data storage device includes: a controller; an engine for performing at least one of encryption and decryption; and a logic circuit. In response to receiving a memory access command, the controller controls the logic circuit to generate an initialization vector based on initialization information in a first portion of the received command, selects a key from a plurality of keys based on key information in a second portion of the command, and controls the engine to perform at least one of encrypting and decrypting plain text data specified by the received command using the initialization vector and the selected key.

12 Claims, 6 Drawing Sheets

(56) References Cited

U.S. PATENT DOCUMENTS

| | | |
|---|---|---|
| 7,962,792 B2 | 6/2011 | Diggs et al. |
| 8,078,918 B2 | 12/2011 | Diggs et al. |
| 8,090,899 B1 | 1/2012 | Syu |
| 8,095,851 B2 | 1/2012 | Diggs et al. |
| 8,108,692 B1 | 1/2012 | Merry et al. |
| 8,122,185 B2 | 2/2012 | Merry, Jr. et al. |
| 8,127,048 B1 | 2/2012 | Merry et al. |
| 8,135,903 B1 | 3/2012 | Kan |
| 8,151,020 B2 | 4/2012 | Merry, Jr. et al. |
| 8,161,227 B1 | 4/2012 | Diggs et al. |
| 8,166,245 B2 | 4/2012 | Diggs et al. |
| 8,243,525 B1 | 8/2012 | Kan |
| 8,254,172 B1 | 8/2012 | Kan |
| 8,261,012 B2 | 9/2012 | Kan |
| 8,296,625 B2 | 10/2012 | Diggs et al. |
| 8,312,207 B2 | 11/2012 | Merry, Jr. et al. |
| 8,316,176 B1 | 11/2012 | Phan et al. |
| 8,341,339 B1 | 12/2012 | Boyle et al. |
| 8,375,151 B1 | 2/2013 | Kan |
| 8,392,635 B2 | 3/2013 | Booth et al. |
| 8,397,107 B1 | 3/2013 | Syu et al. |
| 8,407,449 B1 | 3/2013 | Colon et al. |
| 8,423,722 B1 | 4/2013 | Deforest et al. |
| 8,433,858 B1 | 4/2013 | Diggs et al. |
| 8,442,235 B2 | 5/2013 | Lyakhovitskiy |
| 8,443,167 B1 | 5/2013 | Fallone et al. |
| 8,447,920 B1 | 5/2013 | Syu |
| 8,458,435 B1 | 6/2013 | Rainey, III et al. |
| 8,478,930 B1 | 7/2013 | Syu |
| 8,489,854 B1 | 7/2013 | Colon et al. |
| 8,503,237 B1 | 8/2013 | Horn |
| 8,521,972 B1 | 8/2013 | Boyle et al. |
| 8,549,236 B2 | 10/2013 | Diggs et al. |
| 8,583,835 B1 | 11/2013 | Kan |
| 8,601,311 B2 | 12/2013 | Horn |
| 8,601,313 B1 | 12/2013 | Horn |
| 8,612,669 B1 | 12/2013 | Syu et al. |
| 8,612,804 B1 | 12/2013 | Kang et al. |
| 8,615,681 B2 | 12/2013 | Horn |
| 8,638,602 B1 | 1/2014 | Horn |
| 8,639,872 B1 | 1/2014 | Boyle et al. |
| 8,683,113 B2 | 3/2014 | Abasto et al. |
| 8,700,834 B2 | 4/2014 | Horn et al. |
| 8,700,950 B1 | 4/2014 | Syu |
| 8,700,951 B1 | 4/2014 | Call et al. |
| 8,706,985 B1 | 4/2014 | Boyle et al. |
| 8,707,104 B1 | 4/2014 | Jean |
| 8,713,066 B1 | 4/2014 | Lo et al. |
| 8,713,357 B1 | 4/2014 | Jean et al. |
| 8,719,531 B2 | 5/2014 | Strange et al. |
| 8,724,422 B1 | 5/2014 | Agness et al. |
| 8,725,931 B1 | 5/2014 | Kang |
| 8,745,277 B2 | 6/2014 | Kan |
| 8,751,728 B1 | 6/2014 | Syu et al. |
| 8,769,190 B1 | 7/2014 | Syu et al. |
| 8,769,232 B2 | 7/2014 | Suryabudi et al. |
| 8,775,720 B1 | 7/2014 | Meyer et al. |
| 8,782,327 B1 | 7/2014 | Kang et al. |
| 8,788,778 B1 | 7/2014 | Boyle |
| 8,788,779 B1 | 7/2014 | Horn |
| 8,788,880 B1 | 7/2014 | Gosla et al. |
| 8,793,429 B1 | 7/2014 | Call et al. |
| 2008/0065905 A1 | 3/2008 | Salessi |
| 2008/0273697 A1 | 11/2008 | Greco et al. |
| 2010/0174849 A1 | 7/2010 | Walston et al. |
| 2010/0217977 A1* | 8/2010 | Goodwill ............... G06F 21/78 713/167 |
| 2010/0229005 A1 | 9/2010 | Herman et al. |
| 2010/0250793 A1 | 9/2010 | Syu |
| 2011/0072276 A1* | 3/2011 | Lee ....................... G06F 21/80 713/189 |
| 2011/0087898 A1* | 4/2011 | Williams .................... 713/193 |
| 2011/0099323 A1 | 4/2011 | Syu |
| 2011/0283049 A1 | 11/2011 | Kang et al. |
| 2012/0159042 A1* | 6/2012 | Lott ................... G06F 12/1408 711/103 |
| 2012/0260020 A1 | 10/2012 | Suryabudi et al. |
| 2012/0278531 A1 | 11/2012 | Horn |
| 2012/0284460 A1 | 11/2012 | Guda |
| 2012/0324191 A1 | 12/2012 | Strange et al. |
| 2013/0067242 A1* | 3/2013 | Lyakhovitskiy et al. ..... 713/193 |
| 2013/0117574 A1* | 5/2013 | Jang et al. ................... 713/189 |
| 2013/0132638 A1 | 5/2013 | Horn et al. |
| 2013/0145106 A1 | 6/2013 | Kan |
| 2013/0227301 A1* | 8/2013 | Sarcone ...................... 713/189 |
| 2013/0290793 A1 | 10/2013 | Booth et al. |
| 2014/0059405 A1 | 2/2014 | Syu et al. |
| 2014/0101369 A1 | 4/2014 | Tomlin et al. |
| 2014/0115427 A1 | 4/2014 | Lu |
| 2014/0133220 A1 | 5/2014 | Danilak et al. |
| 2014/0136753 A1 | 5/2014 | Tomlin et al. |
| 2014/0149826 A1 | 5/2014 | Lu et al. |
| 2014/0157078 A1 | 6/2014 | Danilak et al. |
| 2014/0181432 A1 | 6/2014 | Horn |
| 2014/0181517 A1* | 6/2014 | Alaranta et al. ............. 713/168 |
| 2014/0223255 A1 | 8/2014 | Lu et al. |
| 2014/0229733 A1* | 8/2014 | Henze et al. ................ 713/168 |
| 2014/0310536 A1* | 10/2014 | Shacham ..................... 713/193 |

* cited by examiner

SELF-ENCRYPTING DATA STORAGE DEVICE SUPPORTING OBJECT-LEVEL ENCRYPTION

CROSS REFERENCE TO RELATED APPLICATIONS

This application claims the benefit of U.S. provisional application No. 61/836,603, filed Jun. 18, 2013, the disclosure of which is hereby incorporated in its entirety by reference.

BACKGROUND

Field

The present inventive concept relates to data storage devices and more particularly to self-encrypting data storage devices that support object level encryption.

Related Art

Most known self-encrypting drives (SEDs) associate a range of logical block addresses (LBAs), for example a partition, to an encryption key. The finest possible granularity for which self-encryption can be performed is usually a partition. File-level encryption requires finer granularity and also independence from the LBA address. Further, file-level encryption requires knowledge of the LBAs allocated by file; however the data storage device typically does not have this required information.

While the host has knowledge of the LBAs allocated by file, the host typically cannot perform encryption with performance comparable with built-in hardware accelerators that are present in the storage device.

BRIEF DESCRIPTION OF THE DRAWINGS

Aspects and features of the present inventive concept will be more apparent by describing example embodiments with reference to the accompanying drawings, in which.

DETAILED DESCRIPTION

While certain embodiments of the present inventive concept are described, these embodiments are presented by way of example only, and are not intended to limit the scope of the disclosure. The novel methods and systems described herein may be embodied in a variety of other forms. Furthermore, various omissions, substitutions and changes in the form of the methods and systems described herein may be made without departing from the spirit of the disclosure.

Certain example embodiments of the present inventive concept provide file-level encryption (or, more broadly speaking, object-level encryption) with minimal performance impact to the host, and support individualized key selection per input/output (I/O) operation.

Data Storage System Overview

An object-level data storage device that supports self-encrypting drive (SED) functions will be abbreviated as an "object-level SED." In this disclosure, the term "object-level" refers to a broad scope of objects that may exist within a file system of an operating system (e.g., files, directories, nodes, registries, file sub-parts, I/O commands, etc.).

Figure 1:
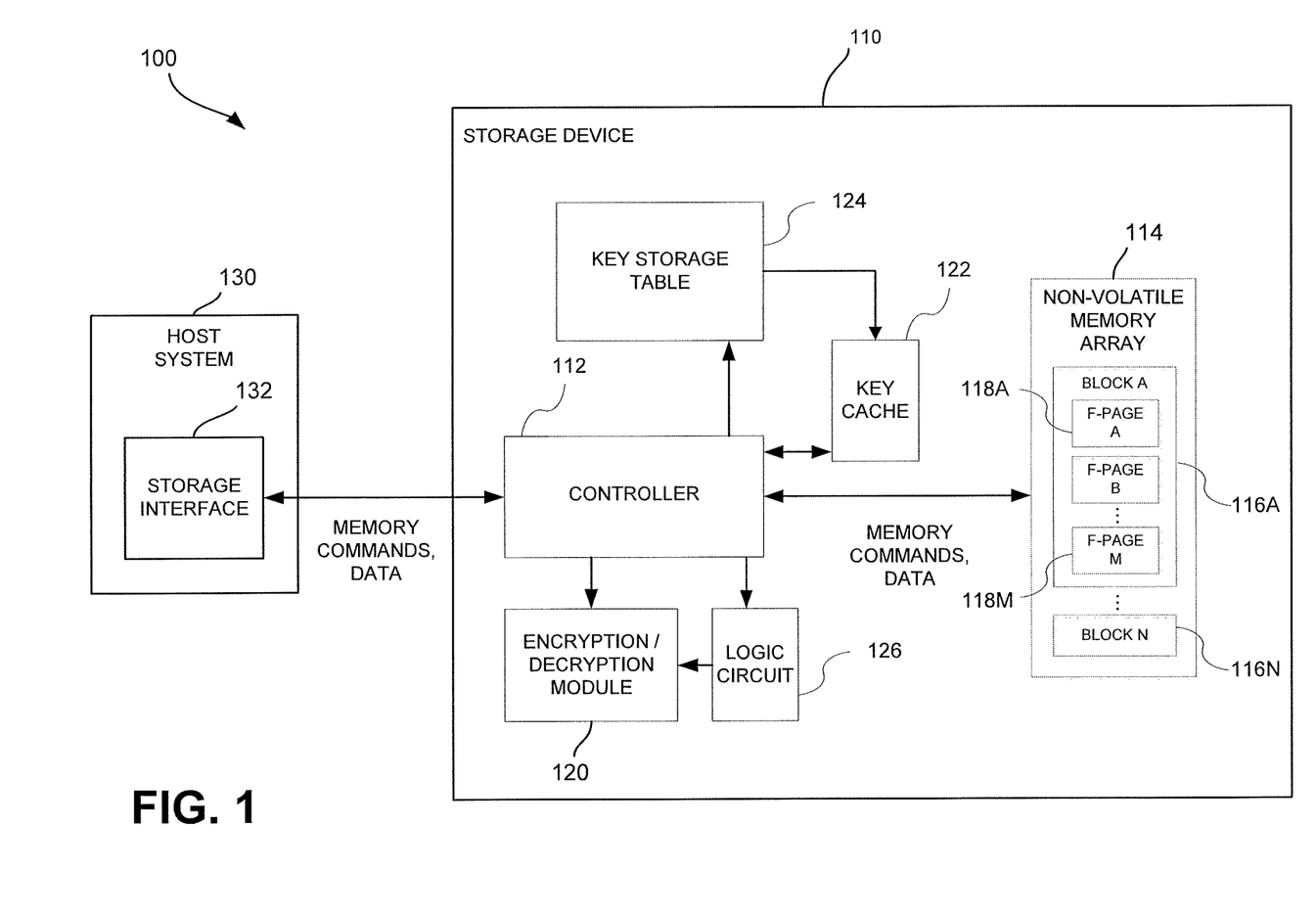
FIG. 1 is a block diagram illustrating an object-level data storage device that supports self-encrypting drive functions according to an example embodiment of the present inventive concept.

FIG. 1 is a block diagram illustrating an object-level SED according to an example embodiment of the present inventive concept. Referring to FIG. 1, an object-level SED 110 may include a controller 112 and a non-volatile solid-state memory array 114. The controller 112 may provide overall control for the object-level SED 110. The non-volatile solid-state memory array 114 may include one or more blocks of storage 116A-116N. While a single non-volatile solid-state memory array 114 is illustrated for convenience, one of ordinary skill in the art will appreciate that the object-level SED 110 may include a plurality of non-volatile solid-state memory arrays 114. The object-level SED 110 may be, for example, but not limited to, a hybrid hard drive, solid state drive, etc.

Each block 116A-116N of the non-volatile solid-state memory array 114 may include a plurality of flash pages (F-pages) 118A-118M. In some example embodiments, each "F-page" is a smallest grouping of memory cells in the non-volatile solid-state memory array 114 that can be programmed in a single operation or as a unit. Alternatively or in addition to the non-volatile solid-state memory array 114, a magnetic rotating media and/or other non-volatile memory such as MRAM and/or phase change memory may be used.

The controller 112 may receive data and/or storage access commands from a storage interface 132 (e.g., a device driver) in a host system 130. Storage access commands communicated by the storage interface 132 may include write and read commands issued by the host system 130. The storage access commands may specify a LBA in the object-level SED 110, and the controller 112 may execute the received storage access commands in the non-volatile solid-state memory array 114. In a hybrid hard drive, data may be stored in a magnetic media storage component (not illustrated) in addition to the non-volatile solid-state memory array 114.

The object-level SED 110 may store data received from the host system 130 so that the object-level SED 110 can act as memory for the host system 130. To facilitate this memory function, the controller 112 may implement a logical interface. The logical interface may present to the host system 130 the memory of the object-level SED 110 as a set of logical addresses (e.g., contiguous address) where data can be stored. The controller 112 may map logical addresses to various physical memory addresses in the non-volatile solid-state memory array 114 and/or other memory module(s).

In one example embodiment, the object-level SED 110 may include an encryption/decryption module 120. In one example embodiment, the encryption/decryption module 120 is configured to perform encryption and/or decryption of data that is stored in at least a portion of the non-volatile solid-state memory array 114. In one example embodiment, the encryption/decryption module 120 is configured to encrypt/decrypt data according to one or more keys selected on a per command basis.

In one example embodiment, the object-level SED 110 may include a logic circuit 126 that generates a statistically unique initialization vector (IV). In one example embodiment, the controller 112 may provide the functions of the encryption/decryption module 120 and/or the logic circuit 126.

Object-Level Encryption

Upon a user login, an operating system (OS) associates a plurality of keys with a user profile. A different plurality of keys may be associated with each user profile.

In an example embodiment, the OS may transfer the keys to the object-level SED 110 for storage in a key cache 122. In another example embodiment, keys may be generated by the object-level SED 110 and stored in a key storage table 124. The OS may transmit information to the object-level SED 110 identifying keys to be loaded from a key storage table 124 to the key cache 122.

Figure 2:
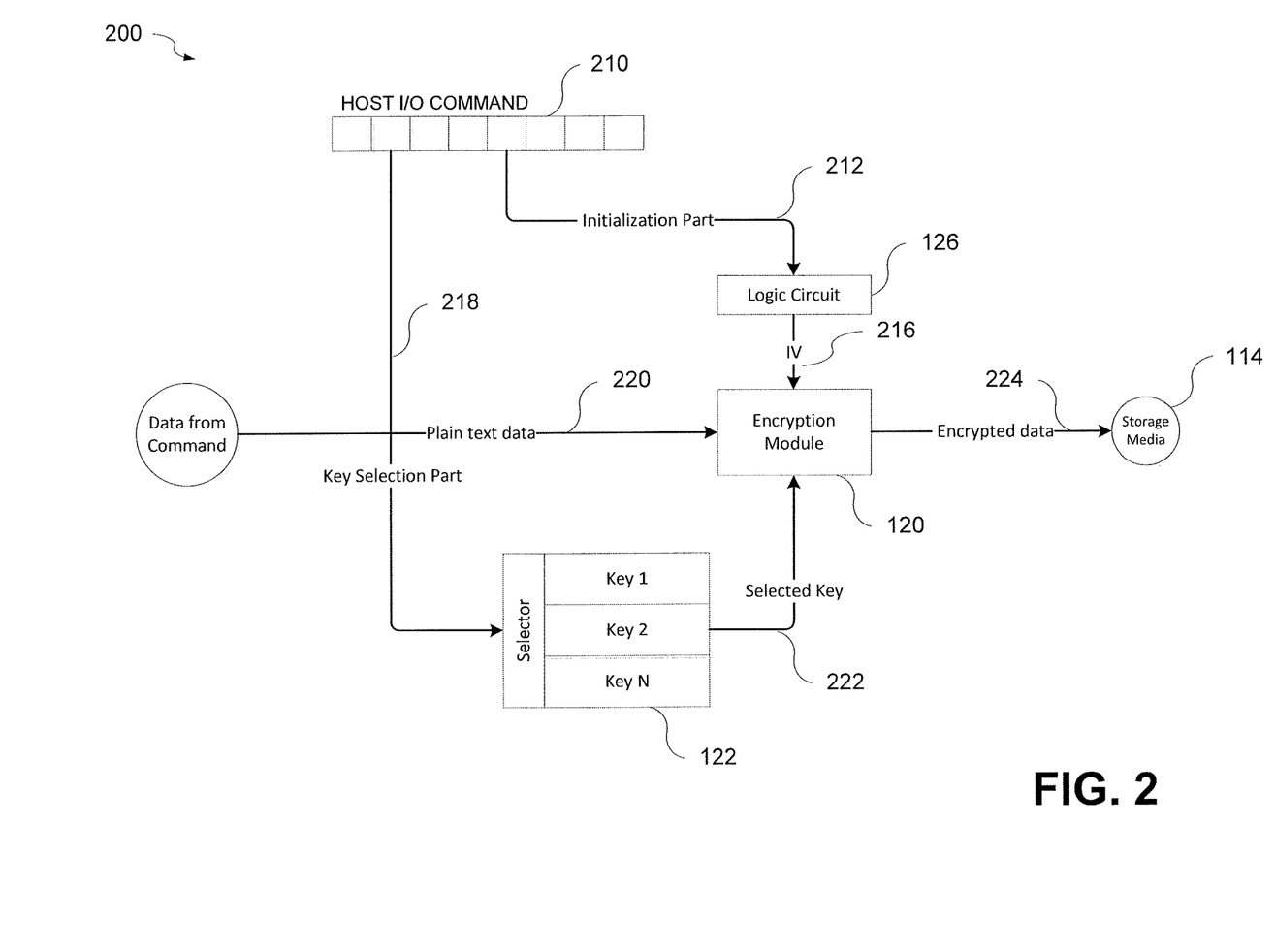
FIG. 2 is a diagram illustrating a process flow for an example command handling process according to an example embodiment of the present inventive concept.

FIG. 2 is a diagram illustrating a process flow for an example command handling process according to an example embodiment of the present inventive concept. The command handling process 200 may handle a host I/O command within an object-level SED that supports self-encrypting drive functions. Referring to FIG. 2, a host I/O command 210 (e.g., a read or write command to the object-level SED) may include several parts, including an initialization part 212 that provides input to a logic circuit 126 that generates an IV 216 used for encryption/decryption of data and a key selection part 218 that handles the selection of keys used for that command.

The command handling process 200 proceeds as follows according to one embodiment. First, the key selection part 218 of the host I/O command 210 provides a reference to a selector which selects a key. In one example embodiment, the key selection part 218 includes a bit field which references a slot in a key cache 122 in the object-level SED. For example, the bit field may reference a key slot number "2," which is an index into the key cache 122. In one example embodiment, there may be 1,024 key slots in the key cache. The OS maintains a log that references keys associated with a user profile to the objects the keys were used to encrypt.

The availability of a key selection part 218 within an individual host I/O command 210 permits the association of a particular key to an individual host I/O command. This association allows for each individual object in the host's file system to be associated with its own unique key, and provides host control over the key used for encryption/decryption for each object. Certain example embodiments provide such control to the host and enable the host to take advantage of the hardware accelerated encryption/decryption components in the object-level SED.

Referring again to FIG. 2, in an example embodiment the initialization part 212 of the host I/O command 210 provides a LBA to the logic circuit 126 in the object-level SED. The logic circuit 126 uses the LBA to generate a statistically unique IV 216. The IV 216 is generated in accordance with a common encryption method, for example, but not limited to, such as XEX-based Tweaked-codebook mode with Ciphertext Stealing (XTS). One of ordinary skill in the art will appreciate that other encryption methods may be used without departing from the scope of the present inventive concept.

The IV 216 is then transmitted to an encryption/decryption module 120 in the object-level SED. The encryption/decryption module 120 takes the IV 216 and plaintext data 220 associated with the command, and encrypts the plaintext data 220 with the selected key 222 from the key cache 122. The resulting encrypted data 224 is then written to storage media, for example, the non-volatile solid-state memory array 114.

In a similar manner, when the host I/O command is a read command, data is read from the media and decryption is performed using the selected key.

In an example embodiment, the components used in key selection, key loading, IV generation, encryption/decryption, etc. are based on automated hardware acceleration.

Figure 3:
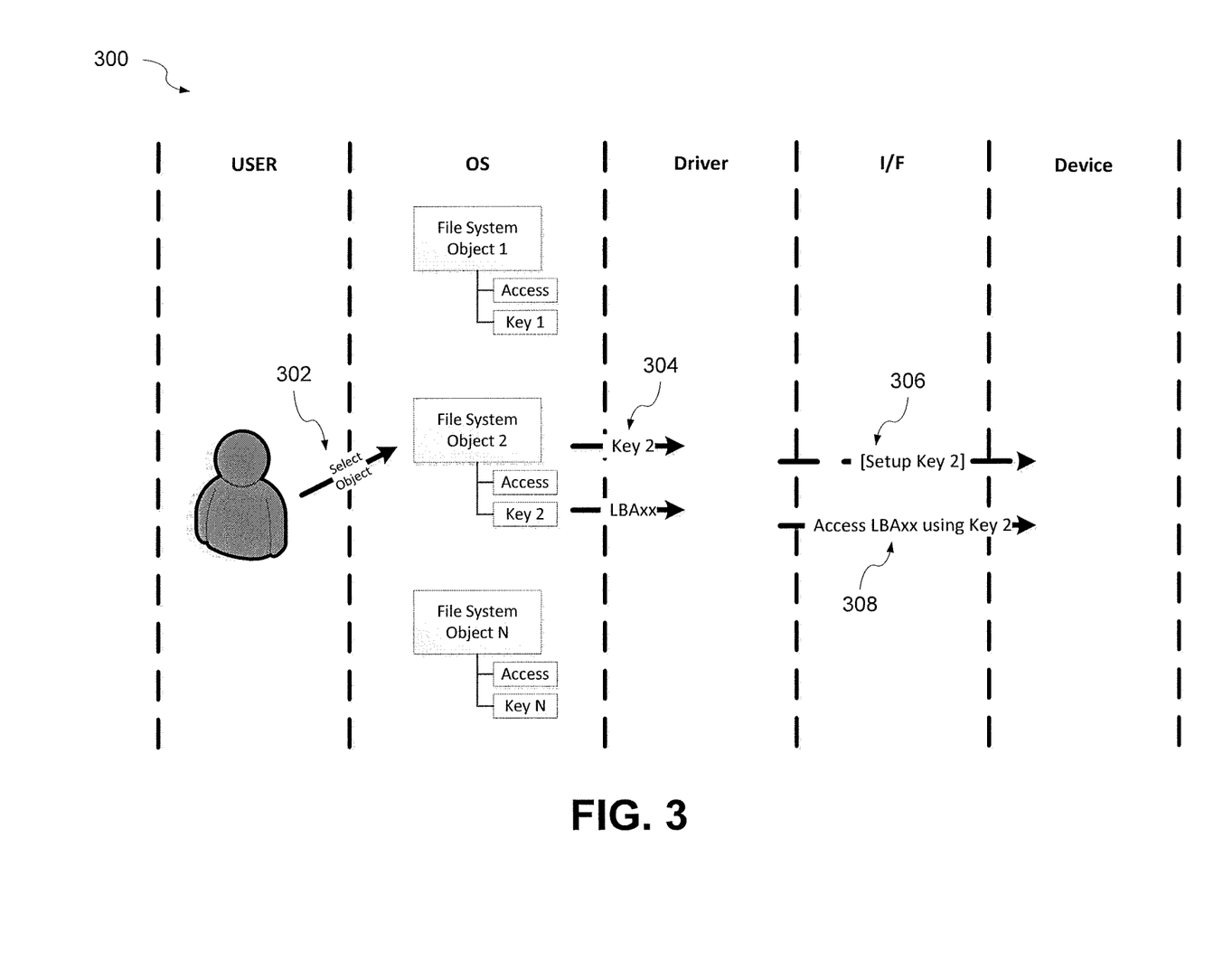
FIG. 3 is a diagram for explaining a layer-component view of a data access process 300 according to an exemplary embodiment of the present inventive concept.

FIG. 3 is a diagram for explaining a layer-component view of a data access process 300 according to an exemplary embodiment of the present inventive concept. Referring to FIG. 3, the operating system (OS) maintains a list of logical objects stored as files in the file system. In an example embodiment, each file is associated with a record containing access rights and credentials ("Access" in FIG. 3), and a data encryption key. The data encryption key may be wrapped. In an example embodiment, the object-level SED ("Device" in FIG. 3) includes encryption acceleration hardware, but otherwise does not store information about the file system used in the OS.

In response to selection of an object for access (302), the OS verifies user credentials. If the user is authorized to access the object, the OS selects the data encryption key (DEK) and a set of LBAs to read or write. This information is sent to the object-level SED driver ("Driver" in FIG. 3) (304).

In an example embodiment, the driver keeps track of used DEKs and usage of the key cache in the object-level SED (refer to FIG. 2, element 202). If a selected key has not yet been loaded to the key cache, the driver issues one or more commands to the device to load the key to the proper cache slot (306).

In an example embodiment, the object-level SED implements an application programming interface (API) including a command to load the key. When the key is loaded into the key cache, the driver inserts the key index (slot number) in the I/O command (308). In the example illustrated in FIG. 3, the command "Access LBAxx using Key 2" command includes a reference to the LBA to be accessed ("LBAxx"), and a reference to the key slot ("Key 2"). One of ordinary skill in the art will appreciate that there are various options to implement this command without departing from the scope of the present inventive concept. For example, in case of the Non-Volatile Memory Express (NVMe) specification, the driver may use reserved bits 8:32 in DWORD13 to reference the key slot.

Upon receiving the command, as previously illustrated in FIG. 2, the object-level SED extracts data from the command, creates the IV, selects proper key, and processes the data transfer with the selected key. In an example embodiment, for diagnostic purposes the command may include a field that to indicate a mode to bypass encryption/decryption on read or write.

Key Management

Figure 4A:
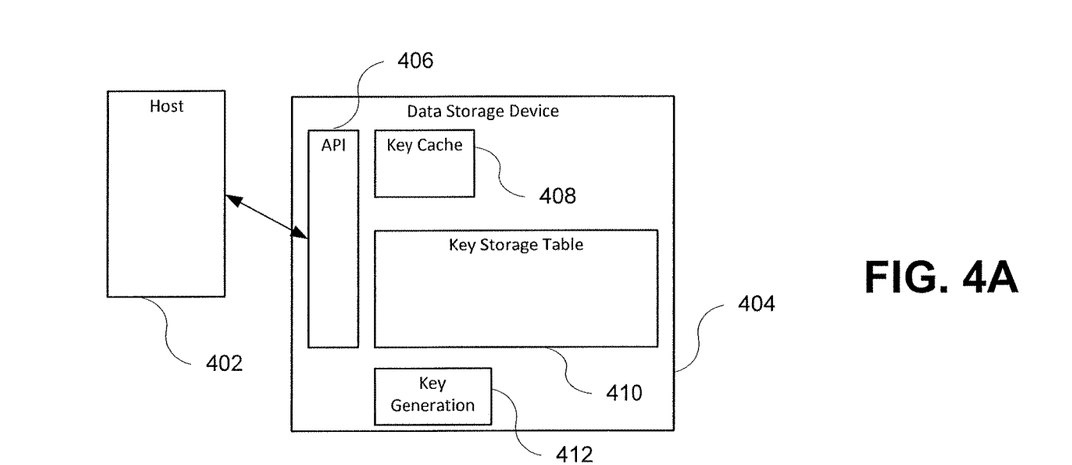
FIG. 4A is a block diagram illustrating an object-level data storage device that supports self-encrypting drive functions in which keys can be generated according to an example embodiment of the present inventive concept.

FIG. 4A is a block diagram illustrating an object-level SED for which keys can be generated according to an example embodiment of the present inventive concept. Referring to FIG. 4A, the object-level SED 404 has a key generation module 412 in which keys can be generated according to any conventional key generation method. In an example embodiment, the keys may be generated by the key generation module 412 and stored within a key storage table 410 in the object-level SED 404 following a standard, for example, but not limited to, the TCG (Trusted Computing Group) model. Keys may be transferred from the key storage table 410 to a key cache 408.

In an example embodiment, the object-level SED 404 may provide to a host 402 an API 406 to manage keys, which may include the ability to create keys by an index in the key storage table 410. The API 406 is part of a storage device interface and provides to the host the ability to configure security features of the system.

In an example embodiment, the host does not have knowledge of the key value, but is given the ability to use the key for data transfers.

In an example embodiment, the key storage table 410 may be larger than the key cache 408 to store substantially all keys associated with stored objects. The key storage table 410 may incorporate a portion of the media space otherwise available for user data, for example in the form of hidden partition or internal logical file system (LFS) space. A driver on the host may be provided with the ability to load a key into the key cache 408 using a key management command within the API in preparation for an I/O command.

Figure 4B:
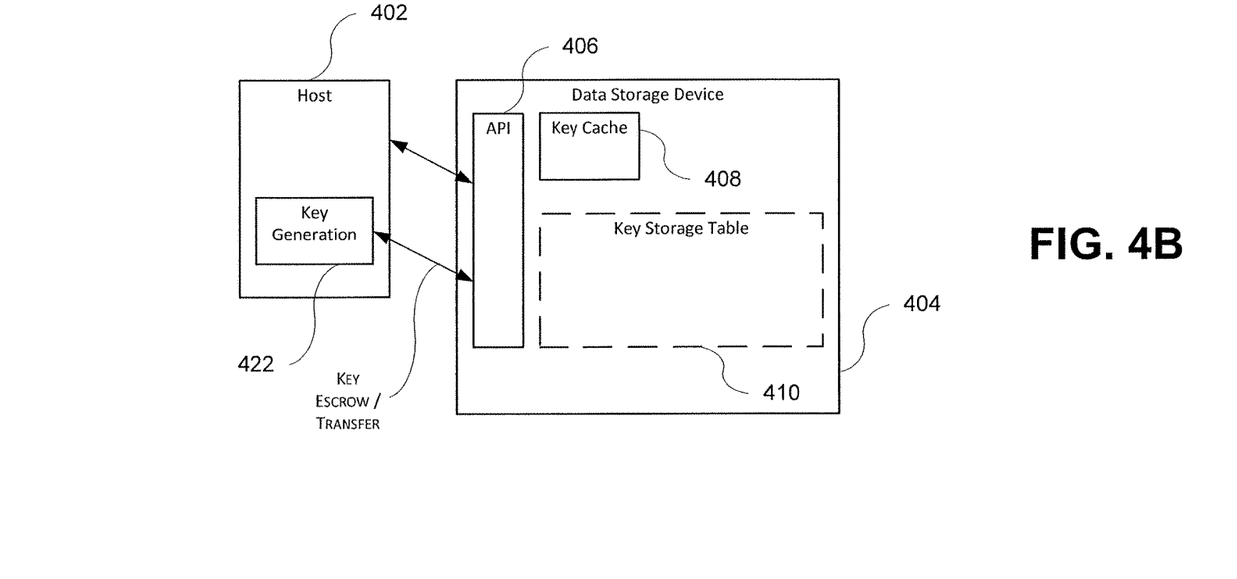
FIG. 4B is a block diagram illustrating an object-level data storage device that supports self-encrypting drive functions for which keys can be generated according to another example embodiment of the present inventive concept.

FIG. 4B is a block diagram illustrating an object-level SED for which keys can be generated according to another example embodiment of the present inventive concept. Referring to FIG. 4B, the keys may be generated on the host 402 by a key generation module 422 and transferred to the object-level SED 404. The keys may be escrowed for the run-time only, rather than being persistent over power cycles. Alternatively, the keys may be stored on the object-level SED 404 in the key storage table 410 as described above, or a combination of escrowed keys and keys stored in the key storage table may be implemented.

In another example embodiment, the key storage table 410 may reside in a dedicated memory area on the host 402, and the object-level SED 404 provided access to that dedicated memory area through a memory mapping function that exists within a protocol, for example, but not limited to, the Peripheral Component Interconnect Express (PCIe) protocol.

Escrowed keys may be transferred in an encrypted form according to conventional security requirements, for example, but not limited to, the FIPS-140 requirements. In an example embodiment, the host and the object-level SED may use asymmetric cryptography to exchange public keys or certificates and establish an encrypted communications channel. One of ordinary skill in the art will appreciate that other ways to transfer keys in encrypted form may be used without departing from the scope of the present inventive concept.

In example embodiments in which the object-level SED stores the keys, the key storage may be encrypted or keys may be wrapped.

Figure 5:
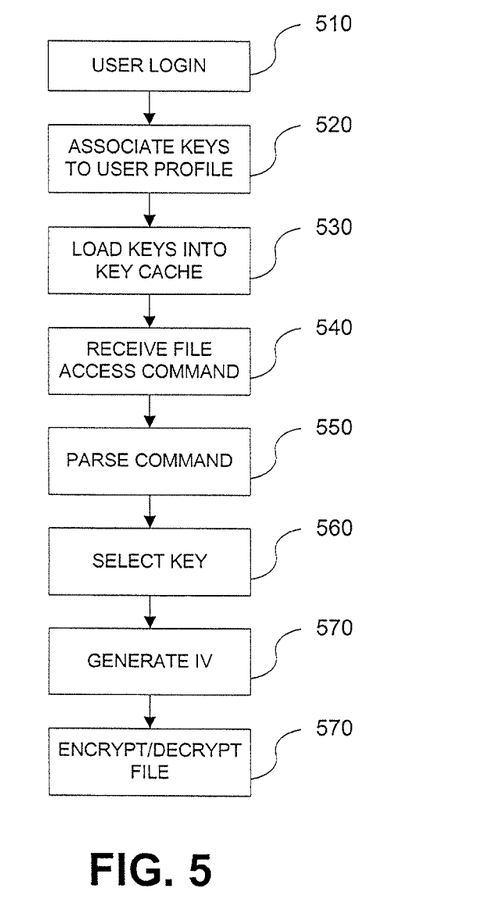
FIG. 5 is a flowchart illustrating a method according to an example embodiment of the present inventive concept.

FIG. 5 is a flowchart illustrating a method according to an example embodiment of the present inventive concept. Referring to FIG. 5, in response to a user login (510) the OS associates a plurality of keys with the user profile (520). The plurality of keys is loaded into the key cache in the object-level SED (530). The OS may provide key information enabling the object-level SED to load the plurality of keys associated with the user profile from the key storage table of the object-level SED. Alternatively, the OS may provide the plurality of keys associated with the user profile to be stored in the key cache.

A file access command containing key information and initialization information is received by the object-level SED (540). The file access command may be, for example, a read or write command. The key information may be an index value indicating a position of a selected key in the key cache. The command is parsed by the object-level SED to obtain the key information and initialization information (550).

A key is selected from the key cache based on the key information (560) and an initialization vector is generated based on the initialization information (570), and the file is encrypted if the access command is a write command or decrypted if the access command is a read command using the selected key and the IV (580).

Figure 6:
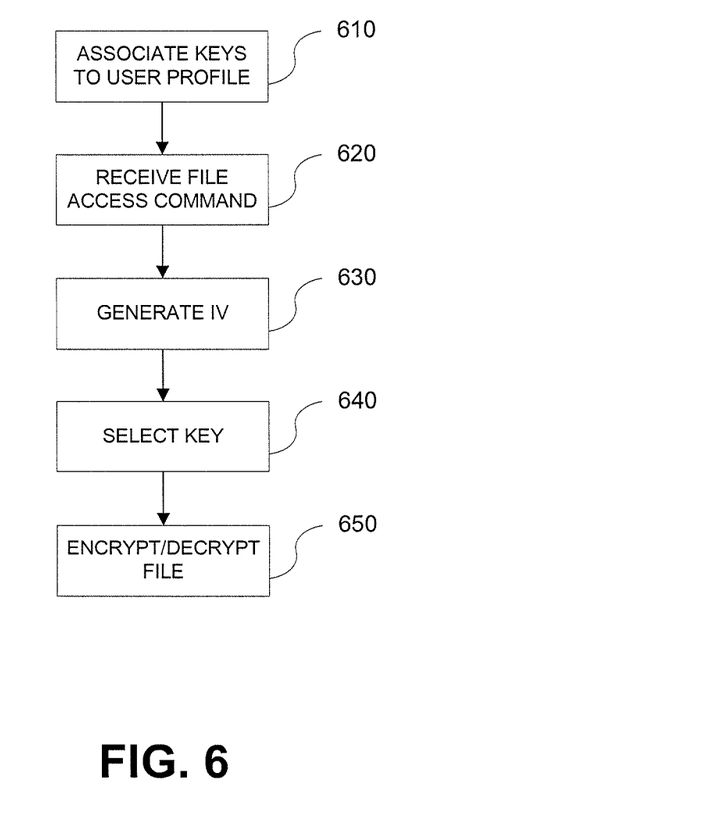
FIG. 6 is a flowchart illustrating a method according to another example embodiment of the present inventive concept.

FIG. 6 is a flowchart illustrating a method according to another example embodiment of the present inventive concept. Referring to FIG. 6, in the OS associates a plurality of keys with the user profile (610). A file access command containing key information and initialization information is received by the object-level SED (620). The file access command may be, for example, a read or write command. The key information may be an index value indicating a position of a selected key in the key cache.

An initialization vector is generated based on the initialization information (630), and a key is selected based on the received key information (640). The file is encrypted if the access command is a write command or decrypted if the access command is a read command using the selected key and the IV (650).

Key Management Commands

Within the key management API described above, the key management commands may be implemented as vendor-specific commands or use security protocol defined in existing standards. In an example embodiment, the key management command set may include the commands shown in Table 1:

TABLE 1

| | |
|---|---|
| Discovery | Allows host to find a number of slots in key cache, key storage table, used algorithms, etc. |
| Set key cache | Allows host to initiate a slot in the key cache. The key can be given as value in case of run-time escrow or as index in key storage table. |
| Zeroize cached key | Allows host to clean up the cache slot when key is not used anymore. |

Depending on the implementation, the object-level SED may support the following commands:
 Generate key <index in key storage table>
 Zeroize key <index in key storage table>
 Purge key storage table
Other Variations Those skilled in the art will appreciate that in some example embodiments, other approaches and methods can be used. For example, the non-volatile solid-state memory array may be implemented using NAND flash memory devices. Other types of solid-state memory devices can alternatively be used, for example, but not limited to, an array of flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NOR memory, EEPROM, Ferroelectric Memory (FeRAM), Magnetoresistive RAM (MRAM), other discrete NVM (non-volatile solid-state memory) chips, or any combination thereof. In one embodiment, the non-volatile solid-state memory array preferably includes multi-level cell (MLC) devices having multi-level cells capable of storing more than a single bit of information, although single-level cell (SLC) memory devices or a combination of SLC and MLC devices may be used. In an example embodiment, the object-level SED may include other memory modules, such as one or more magnetic memory modules.

While certain embodiments of the inventions have been described, these embodiments have been presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions.

The accompanying claims and their equivalents are intended to cover such forms or modifications as would fall within the scope and spirit of the inventions. For example, the various components described may be implemented as software and/or firmware on a processor, ASIC/FPGA, or dedicated hardware. For example, those skilled in the art will appreciate that in some embodiments, the actual steps taken in the processes of some embodiments may differ from those shown in the figures.

Depending on the embodiment, certain of the steps described in the example above may be removed, others may be added, and the sequence of steps may be altered and/or performed in parallel. Also, the features and attributes of the specific embodiments disclosed above may be combined in different ways to form additional embodiments, all of which fall within the scope of the present disclosure.

Although the present disclosure provides certain preferred embodiments and applications, other embodiments that are apparent to those of ordinary skill in the art, including embodiments which do not provide all of the features and advantages set forth herein, are also within the scope of this disclosure.

What is claimed is:

1. A data storage device, comprising:
   a data storage device controller;
   an engine for performing at least one of encryption and decryption; and
   a logic circuit,
   wherein in response to receiving a memory access command, the data storage device controller is configured to:
      control the logic circuit to generate an initialization vector based on initialization information in a first portion of the received memory access command,
      generate a plurality of keys created for at least one of object-level encrypting and decrypting data;
      store the plurality of keys in a key storage table that is part of the data storage device;
      retrieve the plurality of keys from the key storage table and store the plurality of keys in a key cache that is part of the data storage device in response to a command from a host;
      verify authorization to access a requested file, in response to a file access request;
      when authorization to access the requested file is granted, select a key uniquely assigned to a user profile and associated with the file to which access is granted, from the plurality of keys retrieved from the key storage table, based on key selection information in a second portion of the memory access command,
      wherein the key selection information is based on a log maintained by an operating system that references a plurality of keys associated with a user profile and a plurality of objects the plurality of keys were used to encrypt; and
      control the engine to perform in the data storage device at least one of object-level encrypting and decrypting plain text data specified by the received memory access command using the initialization vector and the selected key.

2. The data storage device of claim 1, further comprising a key generation module configured to generate the plurality of keys.

3. The data storage device of claim 1, wherein the plurality of keys is stored in the key cache only for run-time.

4. The data storage device of claim 1, further comprising a non-volatile memory,
   wherein in accordance with the received memory access command, the data storage device controller is configured to write an encrypted file to the non-volatile memory or read an encrypted file to be decrypted from the non-volatile memory.

5. A method for encrypting data received by a data storage device, the method comprising:
   assigning a unique plurality of keys to a user profile;
   receiving a file access command;
   generating, by a data storage device controller, a plurality of keys created for at least one of object-level encrypting and decrypting data;
   storing the plurality of keys in a key storage table that is part of the data storage device;
   generating an initialization vector based on information in a first portion of the received file access command;
   verifying authorization to access a requested file, in response to a file access request;
   when authorization to access the requested file is granted, selecting a key uniquely assigned to a user profile and associated with the file to which access is granted, from the plurality of keys stored in the key storage table, based on key selection information in a second portion of the received file access command,
   wherein the key selection information is based on a log maintained by an operating system that references a plurality of keys associated with a user profile and a plurality of objects the plurality of keys were used to encrypt; and
   performing in the data storage device at least one of object-level encrypting and decrypting plain text data specified by the received file access command using the initialization vector and the selected key.

6. The method of claim 5, further comprising prior to selecting a key, retrieving the plurality of keys from the key storage table and storing them in a key cache.

7. The method of claim 5, wherein the plain text data comprises a logical object stored as one file of a plurality of files, and a list of the plurality of files is maintained by an operating system, and
   wherein each file of the plurality of files is associated with a record containing access rights, credentials, and a key.

8. The method of claim 5, wherein an operating system associates the plurality of keys to the user profile upon user login.

9. A data storage system, comprising:
   a host system; and
   a data storage device, comprising:
   a data storage device controller;
   an engine for performing at least one of encryption and decryption; and
   a logic circuit, wherein in response to receiving a memory access command from the host system, the data storage device controller is configured to:

control the logic circuit to generate an initialization vector based on initialization information in a first portion of the received memory access command, generate a plurality of keys created for at least one of object-level encrypting and decrypting data;

store the plurality of keys in a key storage table that is part of the data storage device;

verify authorization to access a requested file, in response to a file access request;

when authorization to access the requested file is granted, select a key uniquely assigned to a user profile and associated with the file to which access is granted, from the plurality of keys stored in the key storage table, based on key selection information in a second portion of the memory access command, wherein the key selection information is based on a log maintained by an operating system that references a plurality of keys associated with a user profile and a plurality of objects the plurality of keys were used to encrypt; and control the engine to perform in the data storage device at least one of object-level encrypting and decrypting plain text data specified by the received memory access command using the initialization vector and the selected key.

10. The data storage system of claim 9, further comprising:

a key cache, wherein in response to a memory access command from the host system, the data storage device controller is configured to retrieve the plurality of keys from the key storage table and store the plurality of keys in the key cache.

11. The data storage system of claim 10, further comprising a key generation module configured to generate the plurality of keys.

12. The data storage system of claim 10, wherein the plurality of keys is stored in the key cache only for run-time.

* * * * *